July 2, 1968   L. SCHAFER   3,390,646

DEVICE FOR MAKING TWISTED APEX PASTRY

Filed Dec. 29, 1966

United States Patent Office 3,390,646
Patented July 2, 1968

3,390,646
DEVICE FOR MAKING TWISTED APEX PASTRY
Leonhard Schafer, 219 Miriam St.,
Bronx, N.Y. 10458
Filed Dec. 29, 1966, Ser. No. 605,744
4 Claims. (Cl. 107—9)

ABSTRACT OF THE DISCLOSURE

In abstract, this disclosure relates to a device which twists pyramid folded triangular pastry leaves at their apex to effect an interlocking at the apex which will not unlock on baking. The device folds over the corners of a square sheet of pastry on which a spoonable edible filling is centrally disposed as shown in my Patent 2,969,025. The improvement of this invention is in the rotation of the folded pastry unit against the tips of the enveloping arms. This rotation is produced by use of the gear and pinion principle on the holder of the folded pastry.

---

The pastry prepared by the device of U.S. 2,969,025 is well formed. However, upon baking at high temperatures the pastry folded over leaves tend to dry out and exfoliate, thereby exposing the filling, an unwanted result.

According to this invention means are provided to rotate the folded pastry against the seizure of the tips of the pastry by the tips of the four folded over arms.

This invention is illustrated by an embodiment set forth in U.S. Patent 2,969,025, and modified herein as shown in the accompanying drawing in which.

Figure 1:
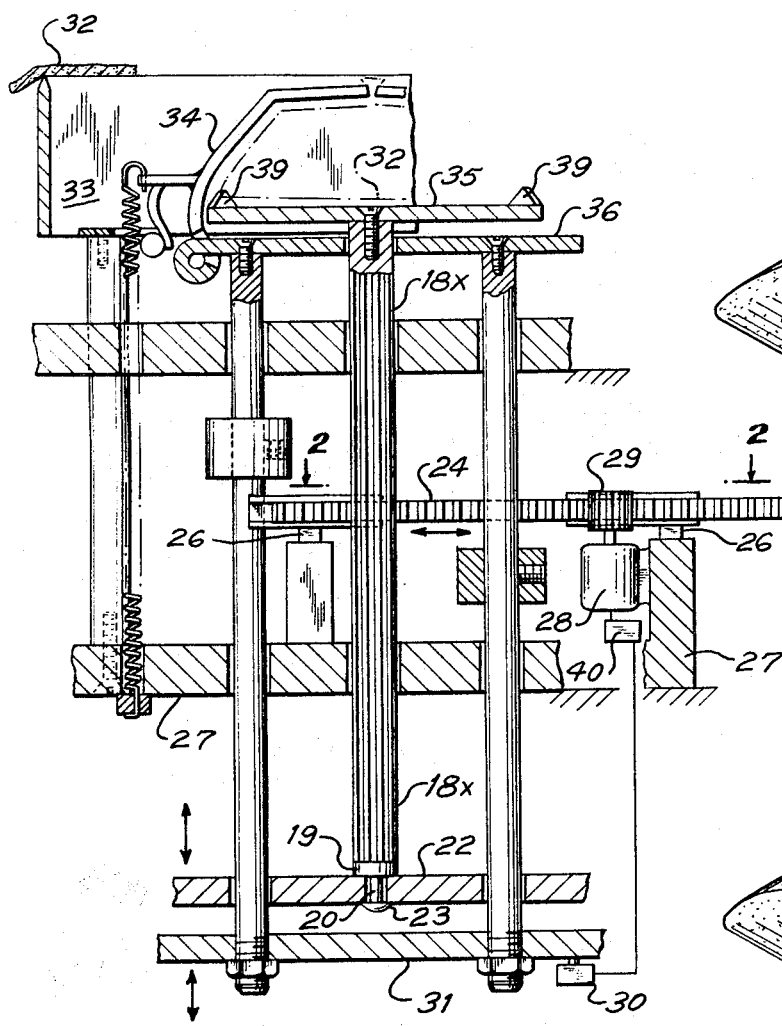
FIG. 1 is a section elevation view of the device showing the means for rotating a folded pastry unit against the folded over arms of the apparatus.

Turning to the drawing, the pastry folder of this invention has the general structure of that shown in U.S. 2,969,025 but modified so as to provide for a predetermined rotation of rod 18.

To obtain such a desired rotation the rod 18 is modified by providing it with longitudinal gear teeth thereby producing the longitudinal gear 18X. To permit gear 18X to rotate against moveable plate 22 a thrust bearing 19 is disposed upon an integral extension lug 20 of gear 18X. The lug 20 extends through a suitable aperture in moveable plate 22 and is preferably provided with a peened end 23.

A longitudinal gear rack 24 having teeth therein meshing with the gear teeth of gear 18X, is disposed against said gear 18X at about its midpoint. The rack 24 is captively disposed in a U-shaped support element 25 against the gear 18X. Preferably the gear 18X and the rack 24 are suitably greased to reduce friction to a minimum. The support element 25 is fixed as by welding to a pair of upright bars 26 which bars are welded or otherwise secured to the fixed base 27.

An electric motor 28 is provided with a driver gear 29, which latter is mated with one end of the gear teeth of rack 24. Motor 28 is fixedly secured to the base 27.

To operate the motor at a critical predetermined time sequence, a microswitch 30 is provided to engage the bottom of moveable plate 31 at its lowermost point of travel.

Figure 3:
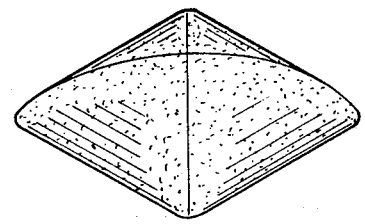
FIG. 3 is an isometric schematic view of the folded pastry of the prior art device of U.S. Patent 2,969,025.

Thus a pastry square 32 cut on the four edges of the square casing 33 is draped onto the four outwardly extended folder arms 34 and onto the platform 35. The lowering of plate 22 causes the gear 18X to slide against the rack 24 with lowering of the platform 35 and its pastry blanket 32 into the casing 33. When platform 35 engages platform 36 both platforms descend together with folding over arms 34 to fold over the corners of the pastry blanket 32 over the filling to a pyramid shaped pastry similar to that shown in FIG. 3. Since the pastry is pliable the sequential folding of arms 34 causes the pastry dough to become wedged between the four spaced-apart apices of the arms 34.

Figure 4:
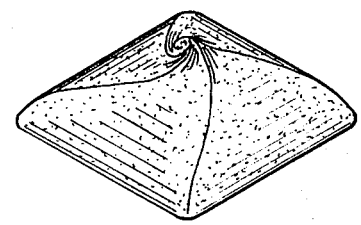
FIG. 4 is an isometric schematic view of the pastry product of this invention, showing its twisted interlocked apex as produced by the modified device herein.
Figure 2:
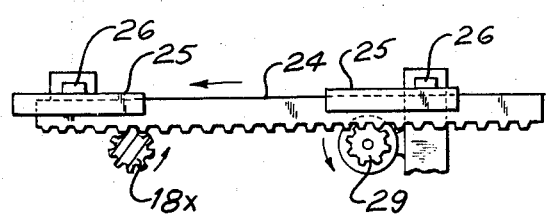
FIG. 2 is a view taken on line 2—2 of FIG. 1.

The base of the pastry 32 is locked to the plurality of ears 39 and since the top of the folded pastry is wedged between the apices of the arms 34, clearly, rotation of the base of the pastry causes an intertwisting or interlocking of the four apices of the dough blanket to give a pastry dough (FIG. 4) having a captive filling therein. On baking pyramidal pastry having interlocked apices, no exfoliation takes places since the intertwisting tends to fuse the various pressed together pastry edges.

When the plate 31 engages the microswitch 30, the motor 28 actuates the gear 29 so that the rack 24 moves a predetermined distance to cause the gear 18X to rotate one to three full turns as determined in control box 40. The rising of plate 22 causes the filled pastry with its twisted apex to be presented for removal from the device. The preparation of the next pastry unit is effected by the control box 40 returning the rack 24 to its original position. Thus the pastry units are alternately twisted clockwise and then counterclockwise depending upon the direction of movement of the rack 24.

This invention has been illustrated by an embodiment thereof, but it is not limited to this embodiment.

I claim:

1. In a pastry forming device having a descendable pastry sheet platform and timed separately actuated descendable pointed apex folding arms to fold the corners of said sheet upon an edible filling to produce a pyramid shaped product the improvement comprising mechanical means for rotating said descendable platform relative to said arms and actuating means for actuating said mechanical means after the completion of the descent of said platform and said folding arms whereby the pyramid shaped pastry unit formed by said folding arms is engaged in the apices thereof and is rotated on said platform to produce a pastry unit having an intertwisted apex.

2. The device of claim 1 wherein said descendable platform has a fixed depending rod having longitudinal peripheral gear teeth substantially throughout the rod length and wherein a linear moveable rack engages said teeth of said rod.

3. The device of claim 2 wherein said actuating means is an electrical microswitch connected to a motor adapted to actuate said rack.

4. The device of claim 3 wherein said rack rotates said rod gear clockwise a predetermined number of degrees of rotation to produce a counterclockwise twist in forming the apex twisted pastry and alternately rotates said rod gear counterclockwise to produce a clockwise twist to the apex of said folded pastry.

References Cited

UNITED STATES PATENTS

| | | | |
|---|---|---|---|
| 2,574,548 | 11/1951 | Deutsch | 107—9 |
| 2,969,025 | 1/1961 | Schafer | 107—8 |
| 3,190,240 | 6/1965 | Archer et al. | 107—8 XR |
| 3,257,973 | 6/1966 | Schafer | 107—9 |

WALTER A. SCHEEL, *Primary Examiner.*

A. O. HENDERSON, *Assistant Examiner.*